(12) United States Patent
Karjalainen et al.

(10) Patent No.: US 6,378,679 B1
(45) Date of Patent: Apr. 30, 2002

(54) CLUTCH

(75) Inventors: Jouni Karjalainen, Sotkamo; Eero Juppi, Kajaani, both of (FI)

(73) Assignee: Suokone Oy, Vuokatti (FI)

( * ) Notice: Subject to any disclaimer, the term of this patent is extended or adjusted under 35 U.S.C. 154(b) by 0 days.

(21) Appl. No.: 09/530,165

(22) PCT Filed: Oct. 23, 1998

(86) PCT No.: PCT/FI98/00827

§ 371 Date: Apr. 24, 2000

§ 102(e) Date: Apr. 24, 2000

(87) PCT Pub. No.: WO99/22155

PCT Pub. Date: May 6, 1999

(30) Foreign Application Priority Data

Oct. 24, 1997 (FI) .................................. 974049

(51) Int. Cl.⁷ ........................ F16D 7/02; F16D 25/0635
(52) U.S. Cl. ........................ 192/56.31; 192/85 AA; 464/41
(58) Field of Search .................. 192/56.3, 56.31, 192/85 A, 85 AA; 464/24, 27, 41, 45

(56) References Cited

U.S. PATENT DOCUMENTS

| | | | |
|---|---|---|---|
| 2,722,302 A | 11/1955 | Stoeckicht | 192/85 |
| 3,199,646 A | 8/1965 | McBride | 192/85 |
| 3,419,117 A | * 12/1968 | Conway | 192/56.31 X |
| 3,610,380 A | 10/1971 | Montalvo, III | 192/85 |
| 4,089,396 A | * 5/1978 | Quick | 192/56.31 |
| 4,509,626 A | 4/1985 | Jones | 192/85 |
| 5,099,733 A | 3/1992 | Kobayashi et al. | 83/425.3 |
| 6,148,981 A | * 11/2000 | Lindenthal | 192/56.3 |

FOREIGN PATENT DOCUMENTS

| | | | |
|---|---|---|---|
| EP | 0088810 A | * 9/1983 | 464/41 |
| EP | 0319115 | 6/1989 | |
| FI | 942023 | 11/1995 | |
| GB | 2111172 | 6/1983 | |
| GB | 2220046 | 12/1989 | |
| GB | 2277358 | 10/1994 | |

* cited by examiner

Primary Examiner—Richard M. Lorence
(74) Attorney, Agent, or Firm—Steinberg & Raskin, P.C.

(57) ABSTRACT

The invention concerns a clutch (10), comprising a clutch disk (22) connected with a first shaft (A) and a brake device (17) connected with a second shaft (B). By means of the brake cylinder (19) of the brake device (17), the brake pad (18) can be coupled into engagement with the clutch disk (22), in which case a movement of rotation between the shafts (A and B) is prevented. In the solution of equipment, between the shaft (A) and the shaft (B), there is a support bearing (21), which supports the movement of rotation between the shafts (A and B) when the clutch is supposed to slip. According to the invention, in the pressure line (59), there is a holding pressure maintained by means of accumulators (100), which holding pressure determines the torque at which the clutch slips.

18 Claims, 9 Drawing Sheets

CLUTCH

FIELD OF THE INVENTION

The invention concerns a clutch.

BACKGROUND OF THE INVENTION

In the operation of, for example, soil milling machines, an important problem has become the rapid wear of the clutches. The occurrence of torques of different magnitudes in milling work is a highly important problem. In the present patent application, an improvement is suggested for the problem stated above.

OBJECTS AND SUMMARY OF THE INVENTION

It is suggested in the present patent application that, when an overload acts upon a brake disk by the intermediate of a cardan shaft, the clutch slips at the friction joint between the brake disk and the brake pads and cuts off the excessively high torque peak. When the torque is lowered to a level lower than the corresponding torque that is held by the friction force, the clutch starts holding again. Thus, the clutch just cuts off the peaks, but holds directly after the torque has become lower. The normal force is supplied to the brake pads that form the friction joint, for example, by means of a fluid pressure supplied from a tractor. In such a case, the brake pads are pressed with a force against the clutch flange. The brake pads and their brake calipers are coupled with the shaft B, and the clutch disk is coupled with the shaft A, respectively. Rotation is permitted between the shafts A and B. Further, the shafts A and B are favourably supported on each other revolvingly by means of a support bearing. The device in accordance with the invention can be used either as a normal clutch or as an overload clutch or as both. When the pressure is discharged from the brake, the clutch slips immediately, i.e. the connection of rotation drive from the drive shaft A to the driven shaft B is cut off.

In the commonest embodiment of the present invention, the pressure circuit passing to the brake cylinders is filled to a certain pressure level, which is maintained by pressure accumulators. Said pressure level in said circuit determines the torque at which the clutch starts slipping. In said embodiment, the clutch is employed exclusively as an overload clutch in order to protect the power transmission from excessive torques.

In a second embodiment of the invention, in connection with the hub part of the shaft B, additionally a connector piece 50 is used, which is coupled with the hub part 11 of the shaft B. In the solution in accordance with the invention, a pressure fluid is passed, for example, from a tractor first into the connector piece and after that into the revolving hub part 11. From the hub part the fluid is passed through a bore further to the cylinders of the brake device, placed in the brake caliper/calipers at the brake disks. By means of the fluid pressure, the brake cylinders press the brake pads into contact with the clutch disk.

In the connector part in accordance with the invention, there is/are a bearing or bearings between the hub part and the connector part. Favourably, pressure seals are also employed in order that the pressurized fluid could be passed without leakages from the bore in the connector piece further into the bore provided in the hub part 11 of the shaft B.

The overload clutch in accordance with the invention comprises a hub part, whose central bore is connected with the shaft of the device that is driven, for example a milling drum. The tool is attached from its shaft to the centre hole in the hub part, and rotation of the tool and the hub part in relation to one another is prevented by means of a groove joint. To the hub part, a connector part in accordance with the invention has been attached, through which the fluid pressure is passed first into the hub part and after that to the cylinders in the brake caliper at the brake disks.

Further, from a bore in the outer face of the hub part, pipes pass to the brake cylinders of the brake device. The output shaft of the driving machine, for example a tractor, is coupled with the clutch disk of the clutch. When the preset maximal torque is exceeded, the overload clutch cuts off said torque portions in excess of the maximal torque mentioned above, and the clutch slips. In such a case, between the brake pads connected with the hub part and the clutch disk, rotation is permitted. When the maximal torque is not exceeded, the rotation drive is transferred from the shaft A to the shaft B.

In accordance with the invention, from the fluid system of, for example, a tractor, the pressurized fluid is passed through the connector in accordance with the invention into the bore provided in the hub part and further, through the hub part, to the brake cylinders, in which connection the brake pads can be pressed with the desired force into contact with the clutch flange of the driving shaft. The overload clutch in accordance with the present invention operates as an overload protection and/or as a clutch device and/or as a brake device.

The clutch in accordance with the invention is characterized in what is stated in the patent claims.

BRIEF DESCRIPTION OF THE DRAWINGS

The invention will be described in the following with reference to some preferred embodiments of the invention illustrated in the figures in the accompanying drawings, the invention being, yet, not supposed to be confined to said embodiments alone.

DETAILED DESCRIPTION OF THE INVENTION

Figure 1A:
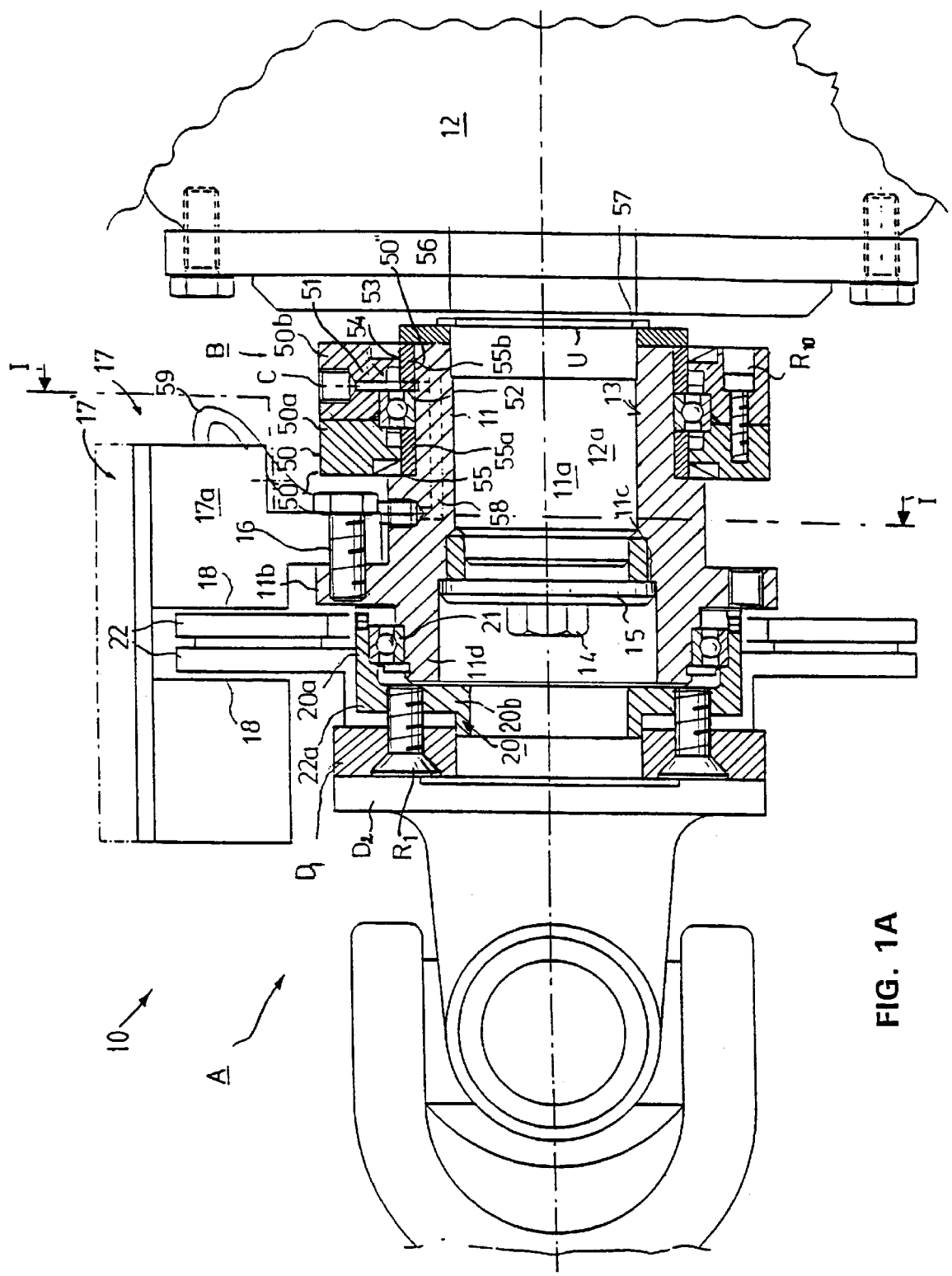
FIG. 1A is a cross-sectional view of an overload clutch in accordance with the invention.

As is shown in FIG. 1A, the overload clutch 10 in accordance with the invention comprises a hub part 11, to whose central bore 11a the shaft 12a of the device to be rotated, such as the milling drum 12 of the milling device, has been connected.

As is shown in FIG. 1A, the end shaft 12a of the milling drum 12 has been connected to the hub part 11 by means of a groove coupling 13 so that the end screw 14 presses the flange 15 against the inner shoulder 11c in the central hole 11a in the hub part 11.

The hub part 11 comprises a flange 11b in its central area. To the flange 11b, further, a caliper 17a of the brake device 17 has been connected by means of screws 16, and said brake device 17 further comprises a brake pad/pads 18 and brake cylinders 19 (in FIG. 2) in the interior of the brake caliper 17a. The brake clutch device 17 favourably consists of three brake device assemblies 17', 17", 17"', each of which comprises two brake pads at both sides of the clutch disk. The number of brake cylinders 19 in one assembly can be, for example, two or, for example, four.

Between the shafts A and B, there is a bearing 21, a so-called support bearing. The bearing supports the movement of rotation between the shafts A and B when the clutch is open or slips. The bearing 21 is fitted inside the bearing housing 20 between the outer face of the end part lid of the hub part 11 and the inner face of the sleeve-like portion 20a of the bearing housing 20. The bearing housing 20 comprises an annular disk 20b connected with the sleeve-like portion 20a, to which disk, further, the clutch disk 22 or clutch flange, which operates as the backup face of the brake pads 18 of the brake device 17, is attached by means of screws $R_1$. The clutch disk 22 is attached from its fastening ring 22a between a separate flange $D_1$ and the part 20b by means of the screws $R_1$. The flange $D_1$ is connected to the flange $D_2$, which is connected with the power output shaft, for example, of the tractor. The joint between the flanges $D_1$ and $D_2$ is preferably a screw joint.

In the embodiment shown in FIG. 1A, the solution of equipment comprises a connector 50 in accordance with the invention. The connector comprises flange-like frame parts 50a and 50b, which have been interconnected by screw means $R_{10}$. Into the annular part 50b, a duct, favourably a bore 51, has been made, which passes from the outer circumferential face 50' of the connector to its inner face 50". Between the parts 50a and 50b, there is a bearing 52. The bearing 52 is connected from its outer race both with the part 50a and with the part 50b, and from its inner race with the hub part 11. At the side of the bearing 52 that is connected to the part 50a, there is a pressure seal 53, and on the face connected to the part 50b and to the bore 51, there is a pressure seal 54. The bearing 52 has been mounted on the outer face of the hub part 11 of the shaft B. The front face of the part 50a is placed against the shoulder 55 of the hub part 11. Inside the annular parts 50a and 50b, there are sleeve parts 55a, 55b. The sleeve parts are placed between the hub part 11 and the parts 50a and 50b. The connector 50 has been attached to the hub part 11 by the intermediate of the end ring 56. Against the end ring 56, a lock ring 57 is placed, which has been fitted onto the shaft 12a of the milling drum into its ring groove U.

Thus, when the rotation drive is passed from the shaft A to the clutch flange 22, the rotation drive is transferred further through the brake device to the hub part 11 and further through it to the shaft 12a and further to the milling drum 12. Even though, during operation, the shafts A and B and the connected parts 11, 12a, etc. revolve, the connector part 50 remains non-revolving. The bearing 52 has been fitted between the connector part 50 and the connected hub part 11, and it permits rotation of the hub part 11 in relation to the non-revolving connector 50.

In the solution of equipment in accordance with the invention, the apparatus can be used as an overload protection alone or as a brake device or as a clutch device or both as an overload protection and as a clutch device. The fluid pressure intake opening C at the medium connection of the connector 50 can have been connected, for example, to a pressure accumulator, in which case the pressure of the medium, for example oil, determined by the pressure accumulator determines the limit torque at which the clutch slips. The clutch slips when the torque arising from loading exceeds a predetermined value determined by the pressure accumulator. Further, the equipment can be connected with a fluid pressure regulation circuit, which can be controlled, for example, from the cabin of the tractor. Thus, for example, exactly in the case of a milling drum 12, the solution of equipment in accordance with the invention permits the use of the solution of equipment both as an overload clutch and as an active clutch device.

When the clutch is in engagement, the brake pads 18 of the brake device 17 are kept in contact with the clutch flange 22 by the pressure in spite of possible wear of the brake shoes or brake pads 18. In such a case, the operation of the device is reliable, and the preset torque at which slipping occurs remains at its preset, invariable value. The duct 58 placed in the hub part 11 of the shaft B communicates, at the side face of the hub part 11, with the duct or pipe 59 that passes to the brake cylinder 19.

Figure 1B:
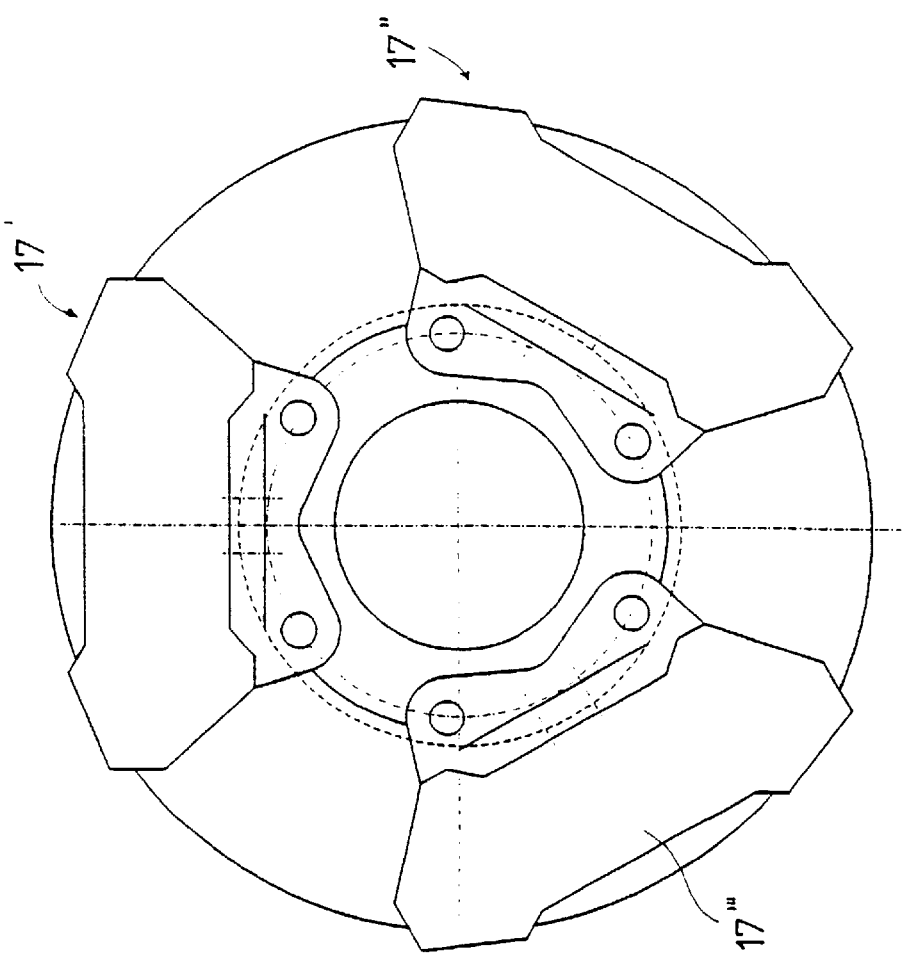
FIG. 1B is a sectional view taken along the line I—I in FIG. 1A.

FIG. 1B is a sectional view taken along the line I—I in FIG. 1A. The figure illustrates the brake device assemblies 17',17", 17"'.

Figure 2:
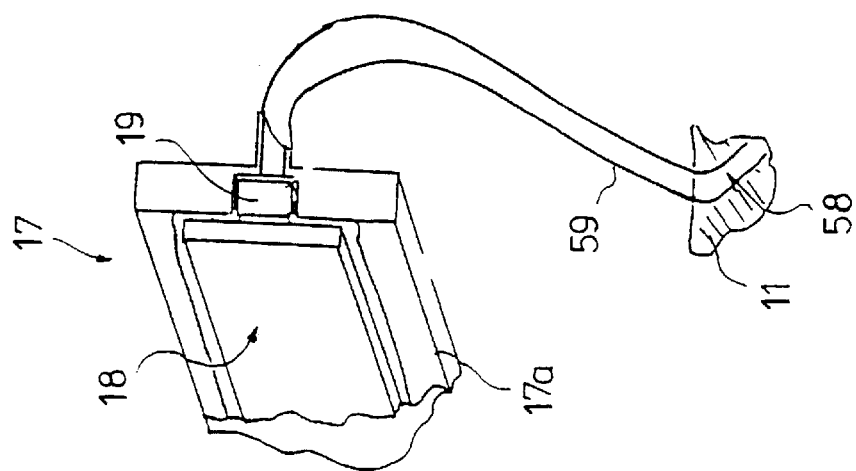
FIG. 2 illustrates the passing of pressure to the brake cylinder.

FIG. 2 illustrates the passing of pressure to the brake cylinder 19 placed in the brake space 17a of the brake device 17, which brake cylinder has been fitted to press the brake pad or friction pad 18 with a force.

Figure 3:
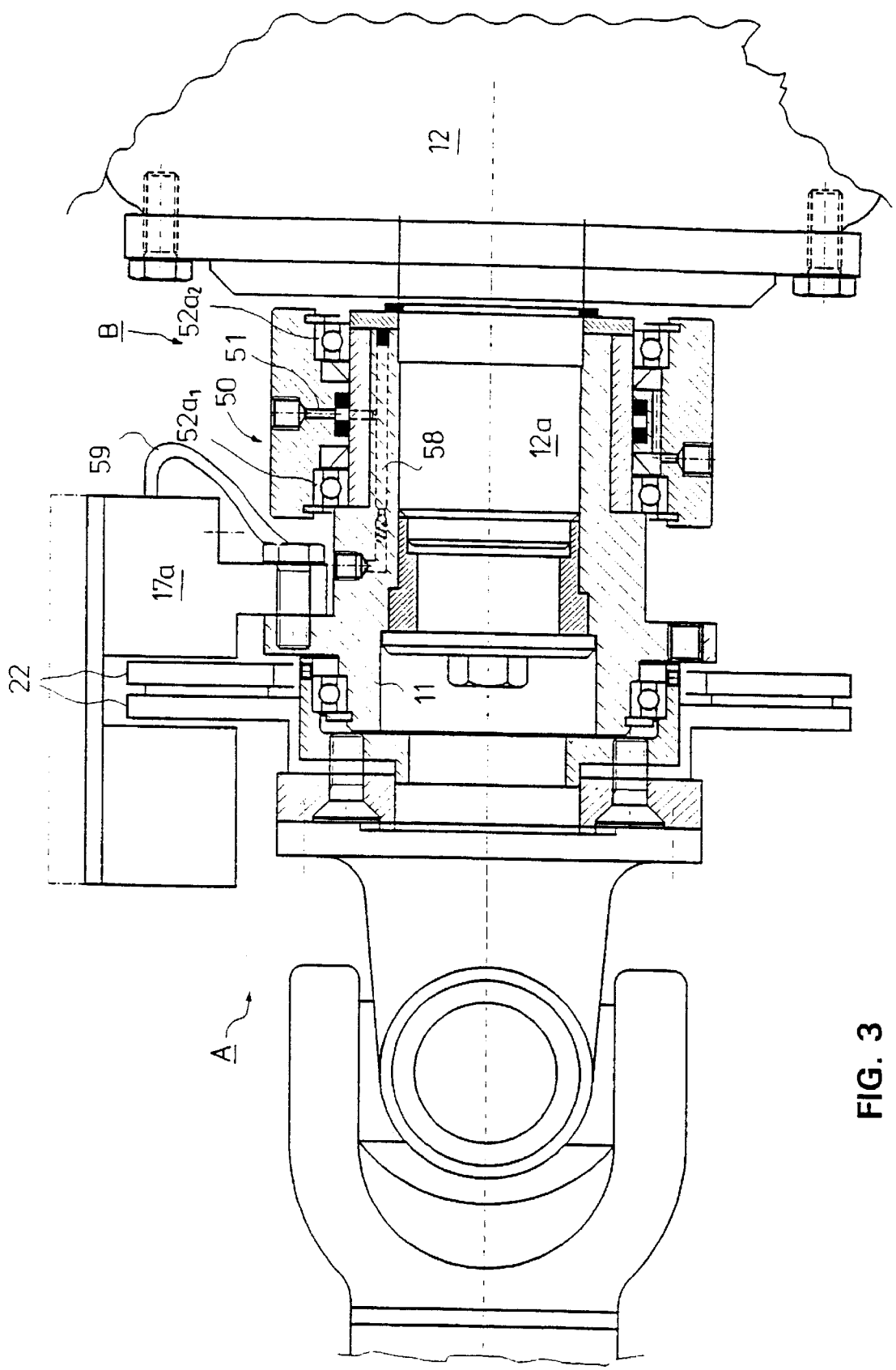
FIG. 3 shows an embodiment in which the connector comprises two bearings.

FIG. 3 shows the connector 50, which comprises two bearings: the bearings $52a_1$ and $52a_2$, by means of which bearings a movement of rotation between the connector 50 and the rotatable hub part 11 placed in the central hole in said connector is permitted. Through the duct 51, a pressure medium is passed into the duct 58 in the hub part 11 and from the duct 58 through the line, such as a hose 59 or equivalent, further to the cylinders 19 or equivalent of the brake/clutch device.

Figure 4:
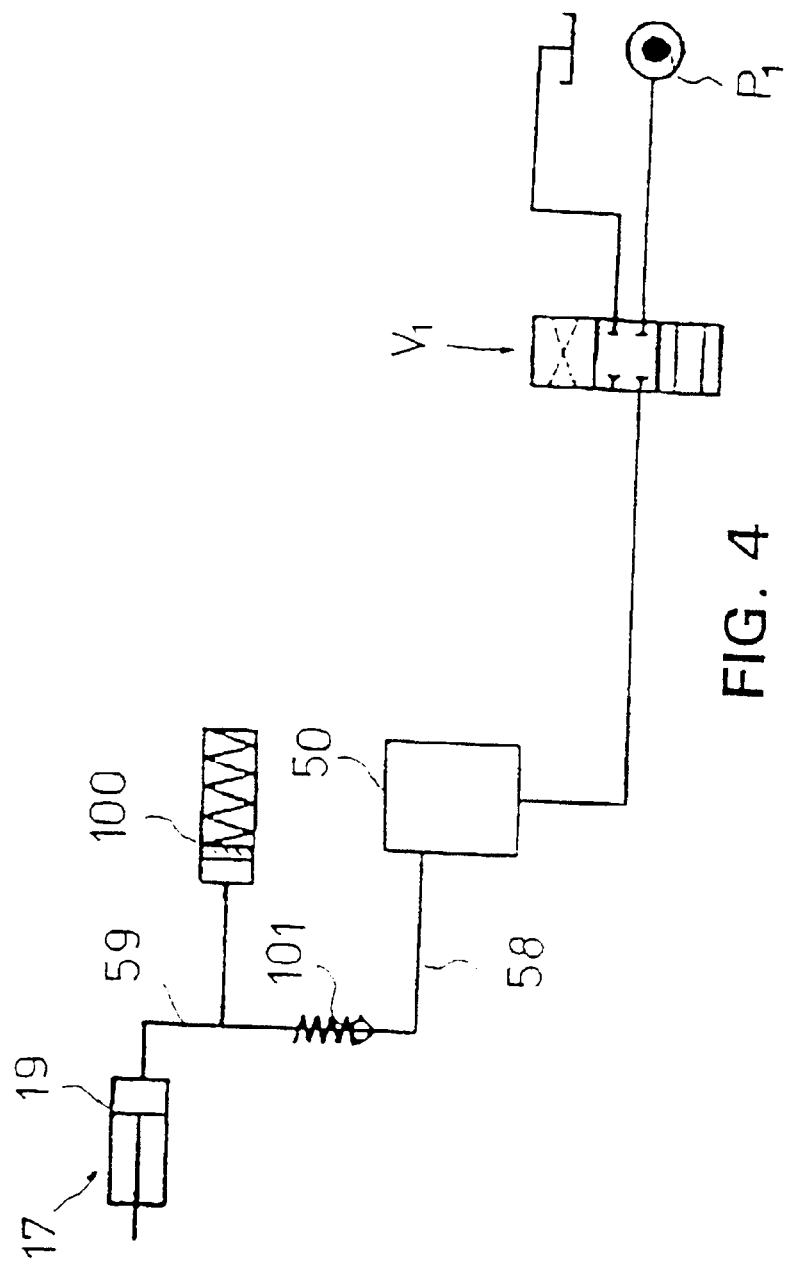
FIG. 4 shows a hydraulic diagram in which, in the circuit after the connector to the brake cylinders, there are a resistor-check valve and a pressure accumulator.

FIG. 4 is a schematic illustration of an embodiment of the invention which is in the other respects similar to the embodiment shown in FIG. 2, but in which a resistor-check valve 101 has been fitted in the duct 59, and additionally, between the resistor-check valve 101 and the brake device 17, a pressure accumulator 100 has been fitted. By means of this arrangement, an invariable pressure is maintained in the brake cylinders 19 in the brake device assemblies 17',17", 17"' of the brake/clutch device 17. Said brake cylinders press the brake pads 18 constantly against the clutch disk 22 with an invariable force, and in said arrangement of equipment the force remains invariable irrespective of wear of the brake pads. In such a case, the connector 50 can also be kept non-pressurized. The connector 50 is used as a pressure supply arrangement when it is desirable to increase the pressure at the outlet side of the resistor-check valve 101 in the duct 59 or when it is desirable to check the pressure in said duct 59. Through the valve $V_1$, the pressure is passed from a source of pressure $P_1$, for example a pump, to the brake cylinders 19.

Figure 5:
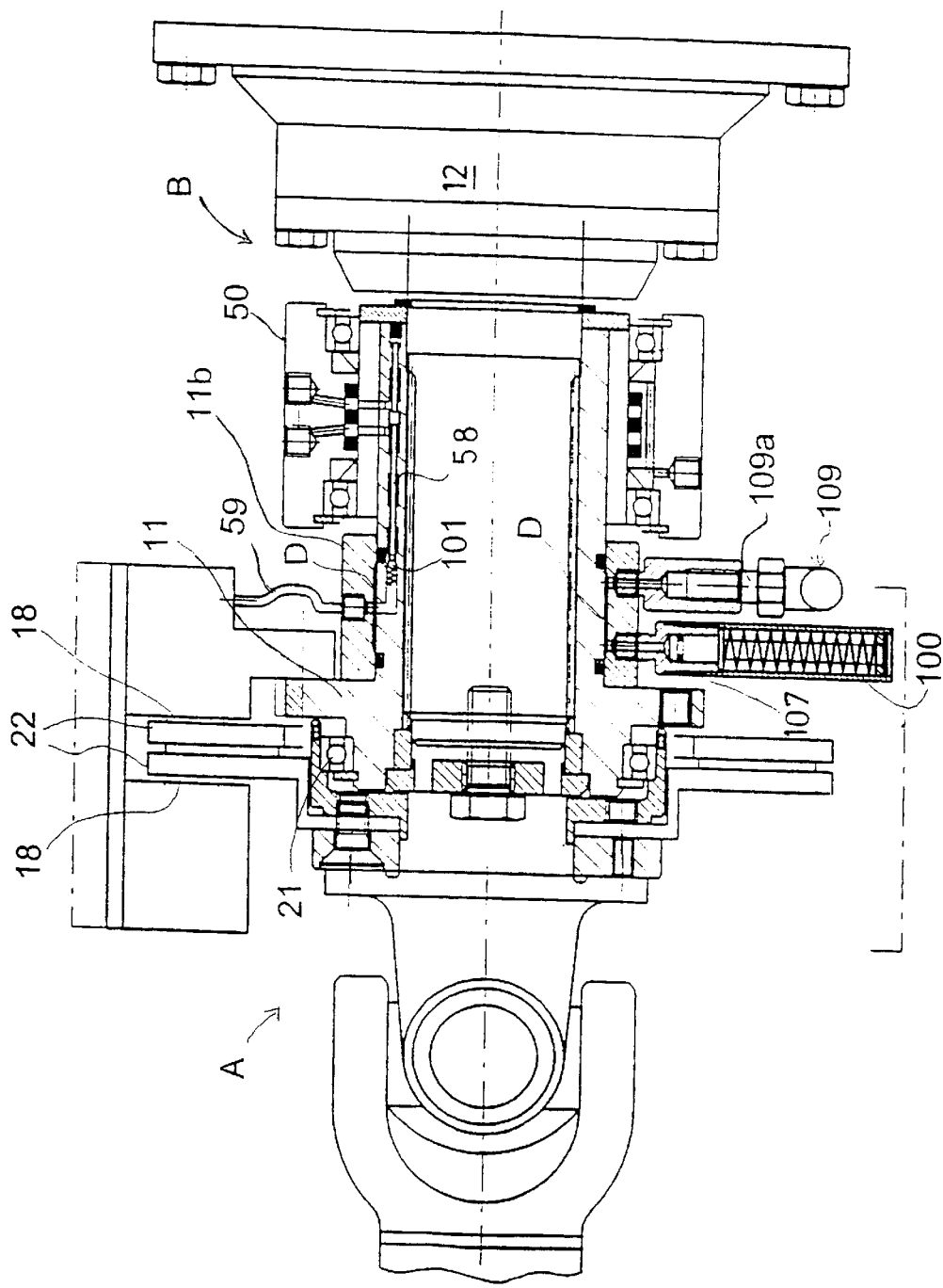
FIG. 5 shows an embodiment of the invention in which the hub part comprises a flange connected with the hub part and revolving along with the hub part and pressure accumulators connected with the flange. The illustration is a sectional side view of a clutch in accordance with the invention.

FIG. 5 shows an embodiment of the invention in which the hub part 11 comprises a flange connected with the hub part and revolving along with the hub part and pressure accumulators 100 connected with the flange 11b. Favourably, there are three pressure accumulators with uniform angular spacing, in which case they are placed at an equilibrium in the hub part 11. Thus, pressure accumulators 100 or pressure cartridges are fitted on the flange 11b in such a way as uniformly spaced that the hub 11 is balanced as a whole.

The flange 11b connected with the hub 11 has been sealed at the edges of the annular fluid space D by means of sealing means 105,106. The fluid space D communicates through ducts 107 passing through the flange 11b with the pressure accumulators 100, favourably vessel constructions which comprise a piston 100a and a spring 100b, in which connection the fluid space D can be filled, at the opposite side of the piston 100a, against the spring force of the spring 100b, to the desired pressure in order to obtain the desired clutch holding torque for the clutch. Into the space D, a line 59 is opened through the connector 11b, which line passes the pressure to the cylinders 19 so as to press the brake pads 18 against the flange 22.

Further, as is shown in the figure, the fluid space D communicates through the check valve 109a with a filling connection 109. In the embodiment shown in FIG. 5, a duct 58 is opened from the connector 50 to the fluid space D between the flange 11b and the hub part 11. As is shown in the figure, the duct 58 includes a check valve 101, which can be pre-controlled by means of the rod 110. The rod 110 is placed in the duct 58. When the pressure is passed into the duct 58, the rod 110 is controlled when the pressure acts upon the piston part $110a_1$ of the rod, for example a shoulder, whereby the check valve 101 is opened. The valve operation related to FIG. 5 is illustrated in FIGS. 6A and 6B.

Figure 6A:
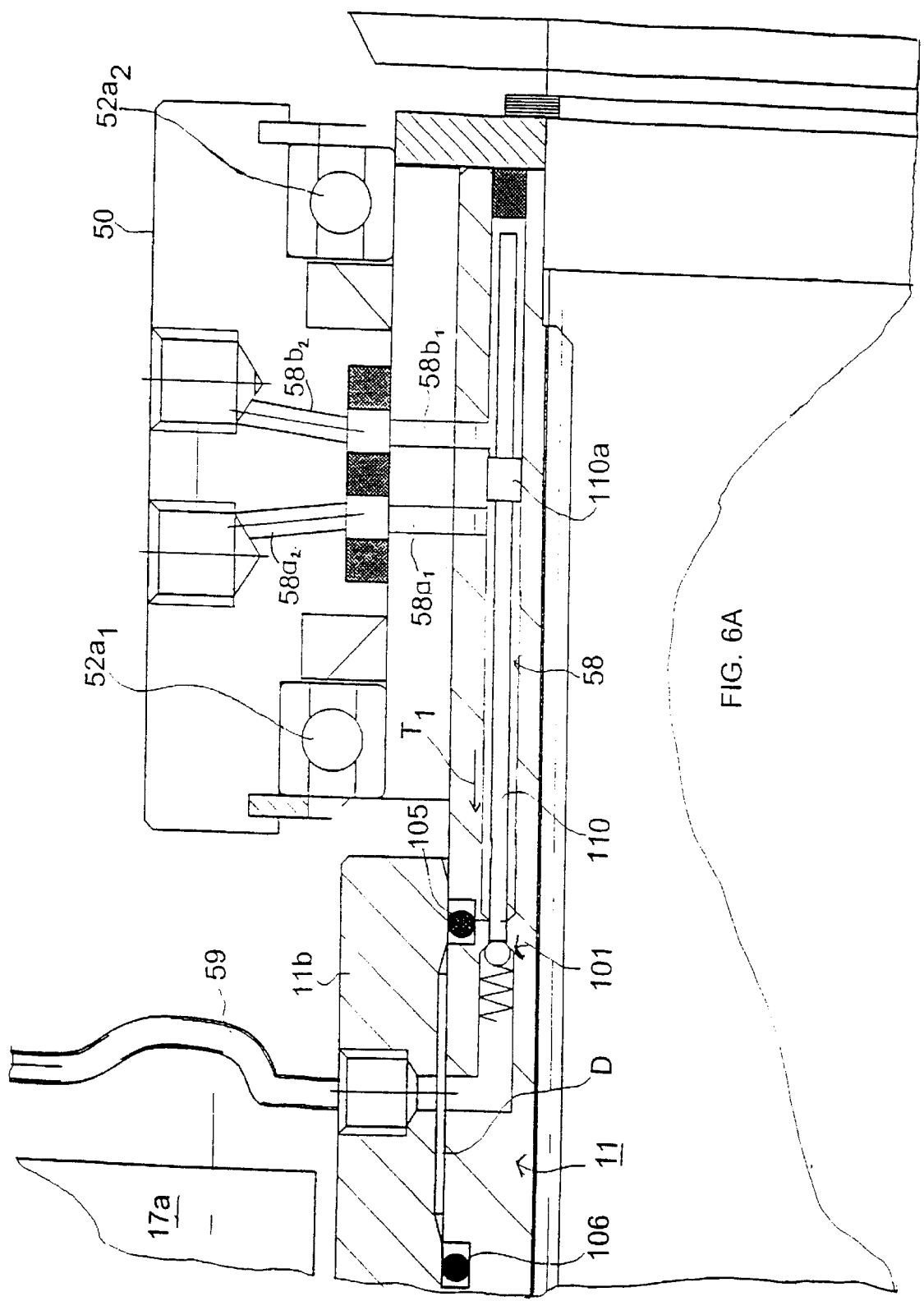
FIG. 6A shows the pressure control of a check valve in an enlarged scale.
Figure 6B:
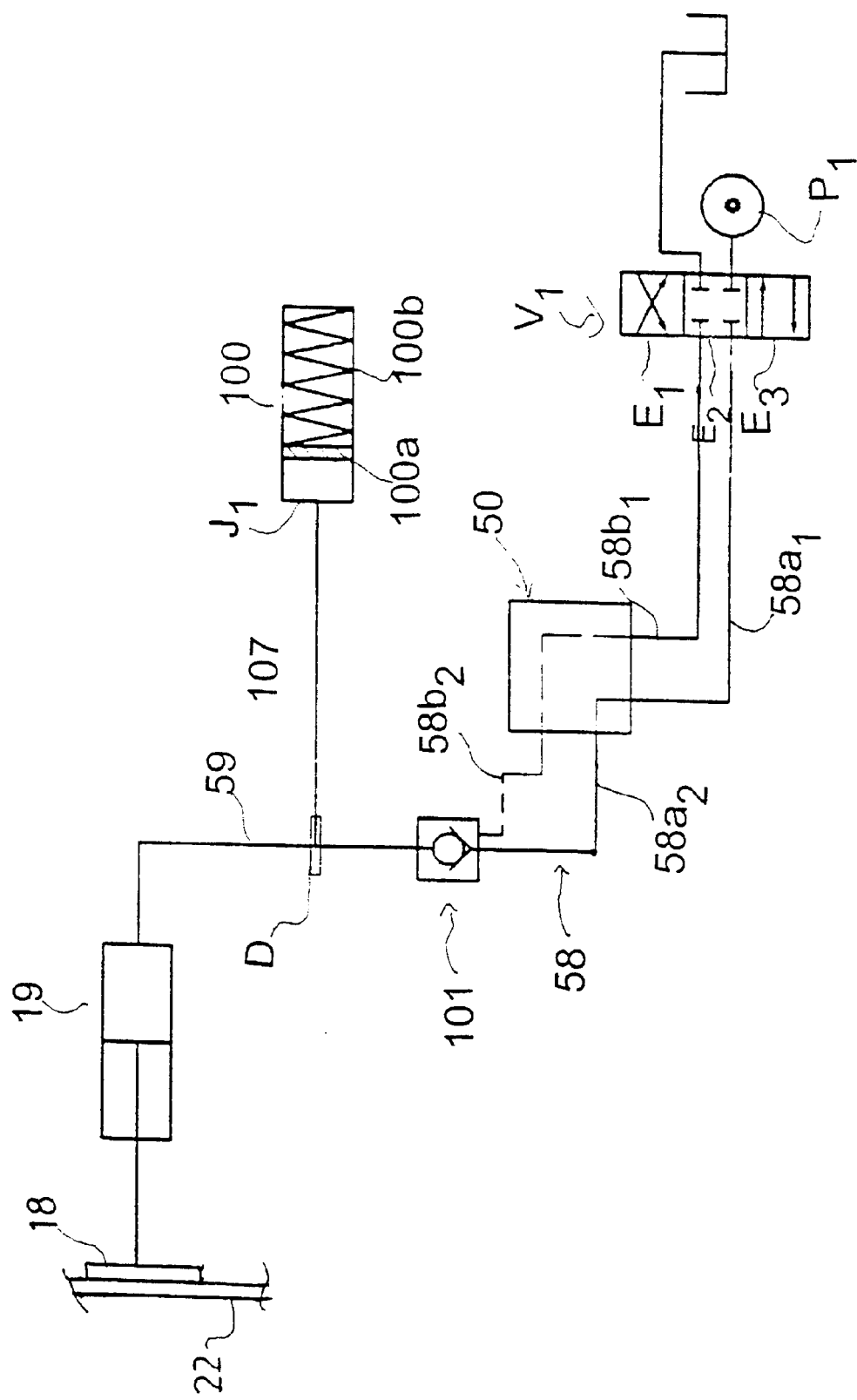
FIG. 6B illustrates a hydraulic diagram of the control of the check valve connected with the construction as shown in FIG. 6A.

FIG. 6A illustrates the operation of the rod 110 placed in the duct 58 for controlling the check valve 101 in an enlarged scale. FIG. 6B is a block diagram illustration of the hydraulic system of control of the check valve 101 related to the construction shown in FIG. 6A. The rod 110 comprises a shoulder $110a_1$, which operates as a piston part, in which connection, when the pressure enters into connection with the shoulder $101a_1$ out of the ducts $58b_1,58b_1$, the rod 110 is displaced in the direction of the arrow $T_1$ so that it opens the check valve 101, in which case the pressure can be discharged through the set of ducts $58a_2,58a_1$ opening into the duct 58 further to the valve $V_1$ and further out when the block $E_1$ in the valve $V_1$ communicates with the ducts $58a_1,58b_1$.

Similarly, when the block $E_3$ in the valve $V_1$ is switched on, the pressure can be charged through the connector 50 into the line 59, which is placed at the other side of the check valve 101 and which includes the pressure accumulator 100.

When the middle block $E_2$ in the valve $V_1$ has been switched on, i.e. when it communicates with the lines $58a_1,58b_1$, the lines $58a_1$ and $58b_1$ are closed. In such a case, the pressure is not passed to the check valve 101, nor is the control pressure passed to said check valve 101.

Thus, the solution of equipment in accordance with the invention is suitable for use either exclusively as a torque protection, in which case a certain holding pressure is maintained in the pressure circuit by means of the pressure accumulator 100, while said holding pressure can be charged into the pressure circuit 59 and while it can be maintained by means of the pressure accumulator 100/accumulators 100. The charging of the pressure circuit with pressure can be carried out through a filling connector 109, i.e. through a so-called filling cartridge. The filling connector 109 is preferably a so-called instant connector, which comprises a check valve 109a in its connection. One embodiment of the device is its use both as a disconnecting clutch and as a torque protection. In such a case, the connector 50 is used, which has been mounted in relation to the hub 11 by means of bearing means, in the way illustrated in the embodiments shown in the earlier figures.

Figures 7A, 7B, 7C:
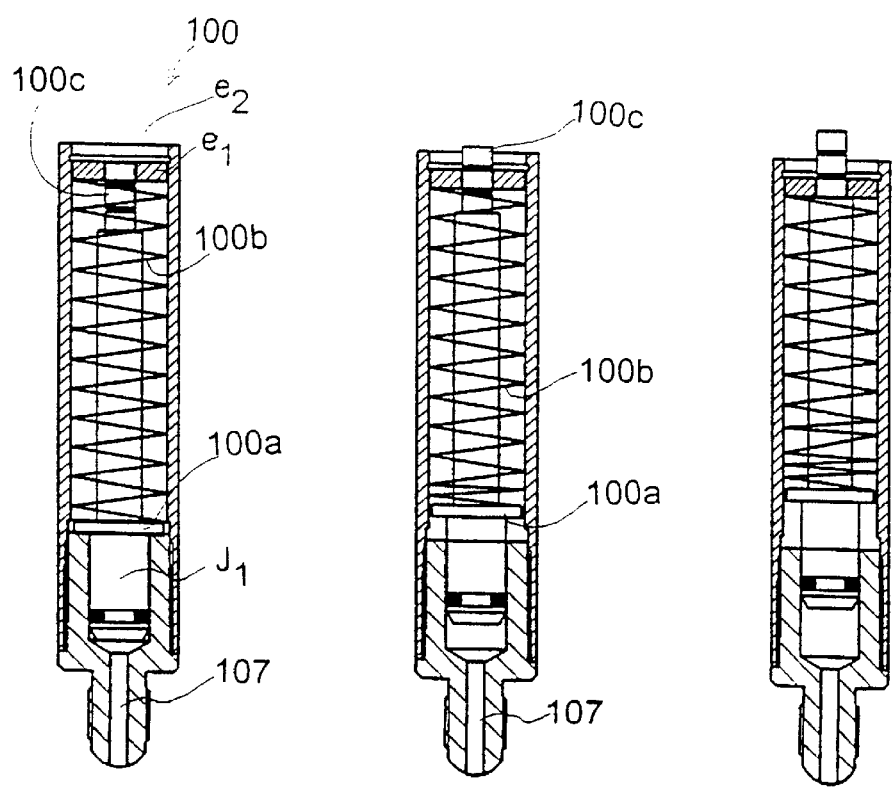
FIGS. 7A, 7B and 7C illustrate a pressure cartridge at different pressure levels.

FIGS. 7A, 7B and 7C illustrate the construction of the pressure cartridge, i.e. of the pressure accumulator 100, and its operation at different pressure levels. As is shown in FIG. 7A, the pressure cartridge comprises a rod 100c connected with the piston 100a, around which rod a spring 100b has been fitted. In accordance with the pressure, the piston moves towards the bottom $e_1$ of the cartridge and shifts the rod 100c connected with the piston 100a out of the cartridge through the hole $e_2$ in the bottom of the cartridge, in which case the pressure that has been reached in the space D can be observed from outside. The cartridges 100 may be provided with springs 100b different from one another, said spring having different spring coefficients. In such a case, the rod of each cartridge projects from the cartridge at a different pressure. In this way it is possible to observe the generation of the pressure in the space D. When a pressure accumulator with spring construction is used as the pressure accumulator 100, by means of suitable selection of the springs a compensation for temperature is made possible as the clutch is heated in operation. The more intensively the spring force is increased when the piston of the pressure cartridge is pressed against the spring, the higher is the pressure that is generated in the space D, which pressure is needed to compensate for the changes of thermal expansion that are produced in the clutch construction and that arise from heating of the clutch.

FIG. 7A shows a degree of filling of the pressure accumulator in which the end of the rod 100c of the pressure accumulator has projected through the hole $e_2$ in the bottom of the pressure accumulator, and FIG. 7C shows a stage in which the pressure has increased further in the piston space $J_1$ of the pressure accumulator, placed in connection with the piston 100a. The increased pressure can be read further from the fact that the rod 100c projects further out of the cartridge.

The clutch in accordance with the invention can be used exclusively as an overload clutch (embodiment shown in FIG. 8) or, when a separate connector 50 and a pressure control related to it are employed, both as an overload clutch and as a disconnecting clutch.

Figure 8:
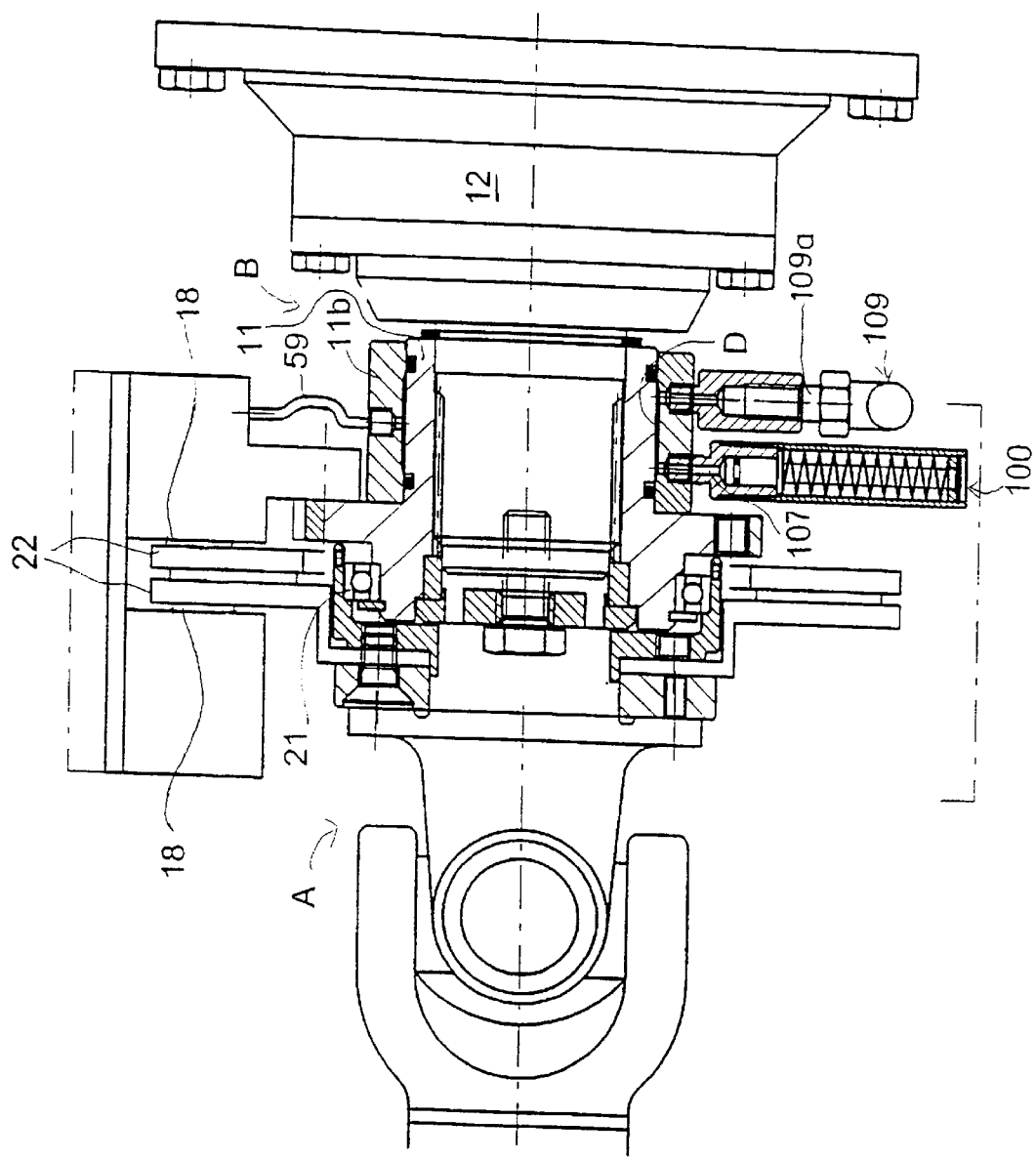
FIG. 8 shows an embodiment of the invention in which a separate connector 50 is not employed at all and in which the circuit 59 of the clutch can be charged through a filling connector, i.e. through a what is called filling cartridge.

The commonest embodiment of the invention is illustrated in FIG. 8. The clutch shown in FIG. 8 operates as an overload clutch only. By means of the use of pressure accumulators 100, a suitable holding pressure is maintained in the circuit 59 of the brake cylinders, which pressure determines the desired torque of slipping.

In accordance with the invention, the pressure in the brake cylinders can be charged into the circuit 59 through the filling connection 109. Through the filling connection, the pressure can be charged, for example, by means of a grease gun which is provided with a pressure gauge. From the pressure gauge, the filling pressure can be read that is desired for the brake cylinders in order to maintain the desired pressure and, thus, the torque protection. The embodiment shown in FIG. 8 is in the other respects similar to the embodiment shown in FIG. 5, except that there is no connector 50 in the embodiment of FIG. 8. Thus, the flange 11b comprises an annular space D between the flange 11b and the hub part 11. The flange 11b revolves along with the hub part 11. The space D is pressurized by means of a grease gun through the filling connection 109, and the pressurized grease/oil or any other pressure medium applies the pressure through the line 59 to the brake cylinder/cylinders 19. The pressure accumulators 100 have been fixed to the outer face of the flange 11b with uniform angular spacing. Their pressure medium space $J_1$ communicates through the line 107 with the space D. Favourably, oil or grease is used as the pressure medium.

Figure 9:
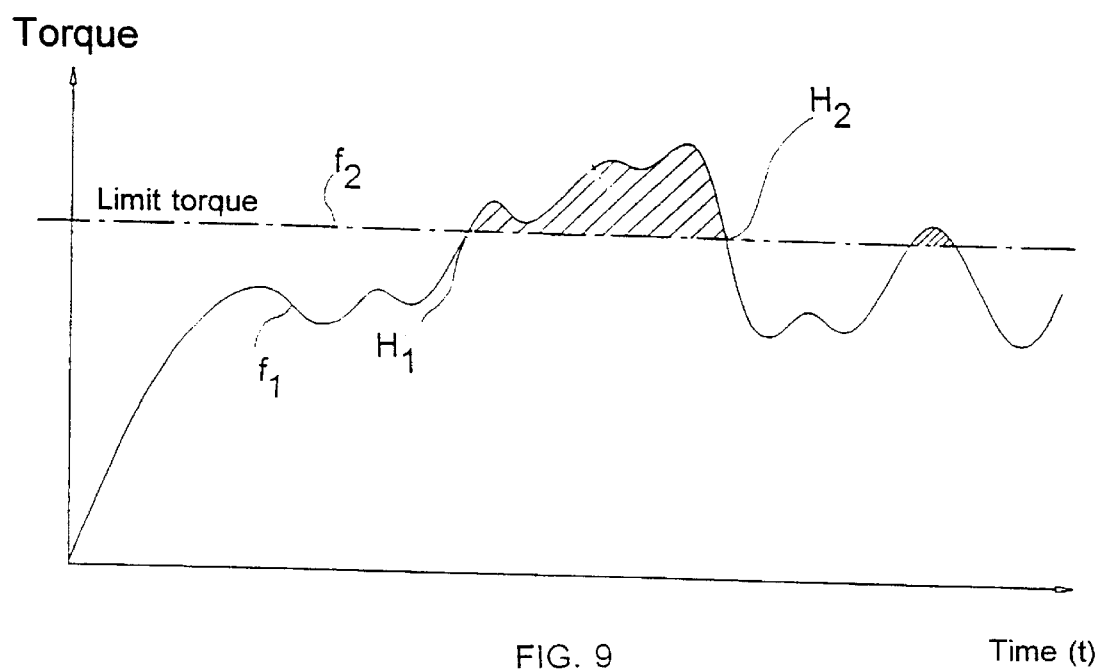
FIG. 9 illustrates the time T in the horizontal system of coordinates and the torque in the vertical system of coordinates, and the graph $f_1$ illustrates the limit torque line that has been regulated by means of the pressure set in the pressure circuit 59.

FIG. 9 illustrates the conduct of a clutch in accordance with the invention in an overload situation. The clutch slips when a certain holding torque that has been regulated by means of the charged pressure is exceeded.

In FIG. 9, the horizontal system of coordinates represents the time T, and the vertical system of coordinates represents the torque. The limit torque line $f_2$ is the torque limit at which the clutch starts slipping. Said torque limit can be adjusted so that the equipment is charged with a certain pressure, which pressure is maintained by the pressure accumulator/accumulators 100. The graph $f_1$ illustrates the conduct of the clutch. At the point $H_1$ the clutch starts slipping, and at the point $H_2$ the clutch starts holding. In FIG. 9, the shaded area is the area of cut-off torque.

What is claimed is:

1. A clutch, comprising a clutch disk connected with a first shaft and an overload limiting device connected with a second shaft, in which connection, by means of an overload limiting cylinder of the device, an overload limiting pad of the device can be coupled into engagement with the clutch disk, in which case a movement of rotation between the shafts is prevented, and that, between the first shaft and the second shaft, there is a support bearing, which supports the movement of rotation between the shafts when the clutch is supposed to slip, wherein the clutch comprises a pressure accumulator, into which the pressure of a medium can be charged that acts upon the cylinder, in which connection, by means of said pressure, the torque is determined at which the clutch slips, said pressure being continuously maintained in the cylinder by means of the pressure charged to the pressure accumulator.

2. A clutch as claimed in claim 1, wherein the pressure accumulator is placed so that they communicate with the line passing to the overload limiting cylinders, and that the pressure accumulator is placed so in the construction that at their forward side there is a check valve, by whose means discharge of the pressure out of the line is prevented, in which line the pressure accumulator is placed or upon which they act.

3. A clutch as claimed in claim 1, wherein the pressure accumulator is spring loaded and comprises a spring and a piston, the piston being fitted to be pressed against the spring force of the spring by means of the pressure introduced in the line that communicates with the over load limiting cylinders.

4. A clutch as claimed in claim 1, wherein the pressure accumulator is fitted as uniformly spaced around a hub part, the hub part being balanced when it revolves.

5. A clutch as claimed in claim 4, wherein the hub part comprises a flange, in which connection an annular space has been formed between the flange and the hub part, and that the pressure accumulator has been attached to the flange, and a duct passes from the annular space into the space in the interior of the pressure accumulator to the vicinity of its piston, and that from the space there is a line passing to the overload limiting cylinder.

6. A clutch as claimed in claim 1, wherein there is a filling connection (109) to the space (D), in which case, through the filling connection (109), the space (D) can be pressurized against the spring force of the springs (100b) in the pressure accumulator (100)/pressure accumulators, and that the filling connection (109) comprises a check valve (109a).

7. A clutch as claimed in claim 3, wherein the piston (100b) of the pressure accumulator is connected with a spindle (100c), which is fitted to project through a hole ($e_1$) placed in the end of the pressure accumulator when pressure is charged into the space (D), the piston being fitted to displace the spindle (100c), in which case the pressure level in the pressure space (D) can be read from the degree of projecting of the spindle (100c) connected with the piston (100b) out of the pressure accumulator (100).

8. A clutch as claimed in claim 5, wherein, in the vicinity of the flange of the hub, around the hub, there is a connector, which has been mounted to revolve in relation to the hub, and the pressure can be introduced to the overload limiting cylinder through the connector.

9. A clutch as claimed in claim 8, wherein the connector is an annular part, in which there is a duct passing from its side face to the inner face of the flange construction, and that there is a bearing, which permits rotation of the hub part in relation to the connector, in which case the pressure of a medium, favourably oil, can be passed through the duct in the connector into the duct that has been formed into the hub part and further, through the duct, to the side face of the hub part, in which connection the duct passing to the overload limiting device is connected to the outlet of the duct in the hub part on the side face of the hub part.

10. A clutch as claimed in claim 8, wherein the connector comprises two halves (50a,50b), and that the duct (51) for the medium, favourably oil, has been formed into one half (50a), and that the bearing (52) has been fitted in the construction so that it is connected both with the half (50a) and with the half (50b) and with the hub part (11).

11. A clutch as claimed in claim 10, wherein, at both sides of the bearing, there are seals (53,54), which prevent leakage of the fluid passed through the connector (50) from the boundary faces between the connector (50) and the hub part (11).

12. A clutch as claimed in claim 8, wherein the pressure circuit passing to the overload limiting cylinder comprises a check valve which can be pre-controlled by means of a pressure, favourably so that the rod that opens the check valve is placed in the duct and so that the pre-control pressure is introduced in connection with the piston part of the rod, in which connection the rod is displaced so as to open the check valve and to discharge the pressure from the line or pressure circuit passing to the overload limiting cylinder and placed at the opposite side of the check valve.

13. A clutch as claimed in claim 1 wherein the overload limiting device that is used comprises a caliper part and overload limiting pads connected with the caliper part and placed at both sides of the clutch flange, and that the overload limiting pads have been fitted to be pressed by means of the overload limiting cylinder against the clutch flange from both sides of the clutch flange by means of the pressure introduced in the line.

14. A clutch as claimed in claim 1, characterized in that there is a groove joint (13) between the hub part (11) and the shaft (12*a*) of the tool device connected with the hub part.

15. A clutch comprising:

a clutch disk coupled to a first shaft;

an overload limiting device coupled to a second shaft rotatable relative to said first shaft, said overload limiting device having an overload limiting cylinder for placing an overload limiting pad into engagement with said clutch disk;

a support bearing structured and arranged to support said first and second shafts when said clutch is in an open position;

a pressure accumulator for maintaining a selected pressure in said overload limiting cylinder.

16. A clutch as claimed in claim 15, wherein said pressure accumulator is arranged to communicate with a line operably coupled to said overload limiting cylinder, and said clutch further comprising a check valve operably connected to said line.

17. A clutch as claimed in claim 15, wherein said pressure accumulator comprises a spring and a piston, said piston being structured and arranged to be pressed against said spring by said pressure medium in said line operably coupled to said overload limiting cylinder.

18. A clutch as claimed in claim 15, wherein said clutch comprises a plurality of said pressure accumulators, said plurality of pressure accumulators being uniformly spaced about a hub member.

\* \* \* \* \*